United States Patent
Davis, III (10) Patent No.: US 9,387,581 B2
(45) Date of Patent: Jul. 12, 2016

(54) HITCH COUPLING TOOL

(71) Applicant: Leland Stanford Davis, III, Portland, OR (US)

(72) Inventor: Leland Stanford Davis, III, Portland, OR (US)

( * ) Notice: Subject to any disclaimer, the term of this patent is extended or adjusted under 35 U.S.C. 154(b) by 0 days.

(21) Appl. No.: 14/704,626

(22) Filed: May 5, 2015

(65) Prior Publication Data
US 2015/0239118 A1 Aug. 27, 2015

Related U.S. Application Data (63) Continuation-in-part of application No. 14/049,036, filed on Oct. 8, 2013, now Pat. No. 9,050,720.

(51) Int. Cl.
| | |
|---|---|
| *B25J 1/00* | (2006.01) |
| *B25G 1/10* | (2006.01) |
| *B65G 7/12* | (2006.01) |
| *B60D 1/58* | (2006.01) |
| *B25B 9/02* | (2006.01) |
| *B25B 5/16* | (2006.01) |

(52) U.S. Cl.
CPC . *B25G 1/102* (2013.01); *B25B 9/02* (2013.01); *B60D 1/58* (2013.01); *B65G 7/12* (2013.01); *B25B 5/163* (2013.01)

(58) Field of Classification Search
USPC ............ 294/15, 902, 16, 26, 92, 103.1; D12/162; 280/504–208, 510–514, 901, 280/507
See application file for complete search history.

(56) References Cited

U.S. PATENT DOCUMENTS

| | | | | |
|---|---|---|---|---|
| 1,868,891 | A * | 7/1932 | Faudi ............... | F16C 11/069 384/203 |
| 2,166,208 | A * | 7/1939 | Dayton ............. | B60D 1/065 280/513 |
| D116,027 | S * | 8/1939 | Harley .............. | 280/513 |
| D129,999 | S * | 10/1941 | Tourneau .......... | D12/162 |
| D148,269 | S * | 1/1948 | Askins .............. | D12/162 |
| 3,184,259 | A * | 5/1965 | Almdale ........... | C03B 35/20 251/368 |
| 4,522,088 | A * | 6/1985 | Berglund ......... | A47J 27/0804 254/131 |
| 4,527,925 | A * | 7/1985 | Bauer ............... | F16C 11/0647 280/513 |
| 5,188,539 | A * | 2/1993 | Langdon .......... | G02B 6/3817 385/53 |
| 6,352,123 | B1 * | 3/2002 | Schlegel ........... | A01B 59/008 172/439 |
| D633,417 | S * | 3/2011 | Najarro ............. | D12/162 |
| 8,235,411 | B2 * | 8/2012 | Works ............... | B60D 1/60 280/507 |
| 2004/0051326 | A1 * | 3/2004 | Belik ................ | B25B 5/147 294/86.15 |

* cited by examiner

Primary Examiner — Paul T Chin
(74) Attorney, Agent, or Firm — Mark S Hubert (57) ABSTRACT

A compact, lightweight hitch-coupling tool that can lift, move, and align a hitch-head assembly by trapping the hitch ball between a pair of wedge shaped, gripping prongs and an opposing pair of interchangeable plates. The mass of hitch head assembly is evenly distributed through the center of the head of the tool allowing a user to easily maneuver large hitch-head assemblies with one hand.

4 Claims, 9 Drawing Sheets

HITCH COUPLING TOOL

CLAIM OF DOMESTIC PRIORITY

This application incorporates by reference herein and claims of the benefit under 35 U.S.C. 120 of U.S. provisional application No. 61/730,339 filed Nov. 27, 2012 and U.S. utility application Ser. No. 14/049,036 filed Oct. 8, 2013.

BACKGROUND OF THE INVENTION

The present invention relates to a lifting tool for a hitch coupler, specifically a device to safely, and ergonomically grasp the lower ball portion of a hitch ball mount.

Anyone who has ever had to couple a trailer hitch to the receiver of their towing vehicle knows that it can be a cumbersome, dirty, and often a frustrating task. In the case of large loads, such as RVs, boats, equestrian trailers, which can be hard to maneuver in a safe and controlled manner, a weight distribution hitch is required to improve the towing vehicle's ability to brake, steer, and turn, preventing dangerous out-of-control driving situations. Unfortunately, the combination of an adjustable weight distribution shank and adjustable ball mount, results in a heavy hitch-head assembly, with an awkward center of mass, which is difficult to pick up, move, and insert into the receiver on a towing vehicle. Add in a lubricated hitch ball, and now not only is the hitch-head assembly awkward and heavy, it is also slippery.

SUMMARY OF THE INVENTION

At the heart of the present invention is a tool for lifting and maneuvering a hitch-coupling that allows the user to easily pick up a hitch-head assembly by the attached hitch ball and efficiently maneuver that assembly in and out of the vehicle receiver or from the receiver to a remote location for storage. The hitch-coupling tool will accommodate any hitch ball size, making it universal. When the hitch-coupling tool is attached to the hitch ball, the center of mass of the hitch-head assembly/tool is shifted through the center of the head of the hitch-coupling tool, making the hitch-head assembly easier to carry and maneuver. Should the towing vehicle have limited space around the receiver, the hitch-coupling tool is pivotable about the hitch ball, allowing the user to move the tool handle out of the way of the towing vehicle's bumper. The hitch-coupling tool of the present invention is lightweight and easy to use, allowing a broader range of individuals to move and install the hitch-head assembly of a weight distribution hitch. The hitch-coupling tool of the present invention firmly grips the hitch ball of the hitch-head assembly, preventing rotation of the hitch-head.

DETAILED DESCRIPTION

The term hitch coupling or coupler are used interchangeably. As used herein these terms mean a device for connecting a towable device (any form of trailer) to a motorized vehicle. The hitch coupling has a ball (also called a ball hitch) adjacent one end that extends vertically from the hitch coupling and is sized to matingly engage a hitch receiver on the towable device. The second end of the hitch coupling is configured to extend into the vehicles trailer hitch and be secured by a hitch pin.

The term "planar cavity" as used herein refers to an open planar space, (i.e. a plane having a thickness) that would be the volume contained between the plane of the first face of the head of the tool and the second face of the head of the tool, and bounded by the concavity of the crescent shaped head.

The term "open" planar cavity as used herein refers to a planar cavity wherein the concavity of the tool head is open between the two ends of the crescent configuration.

Figure 1:
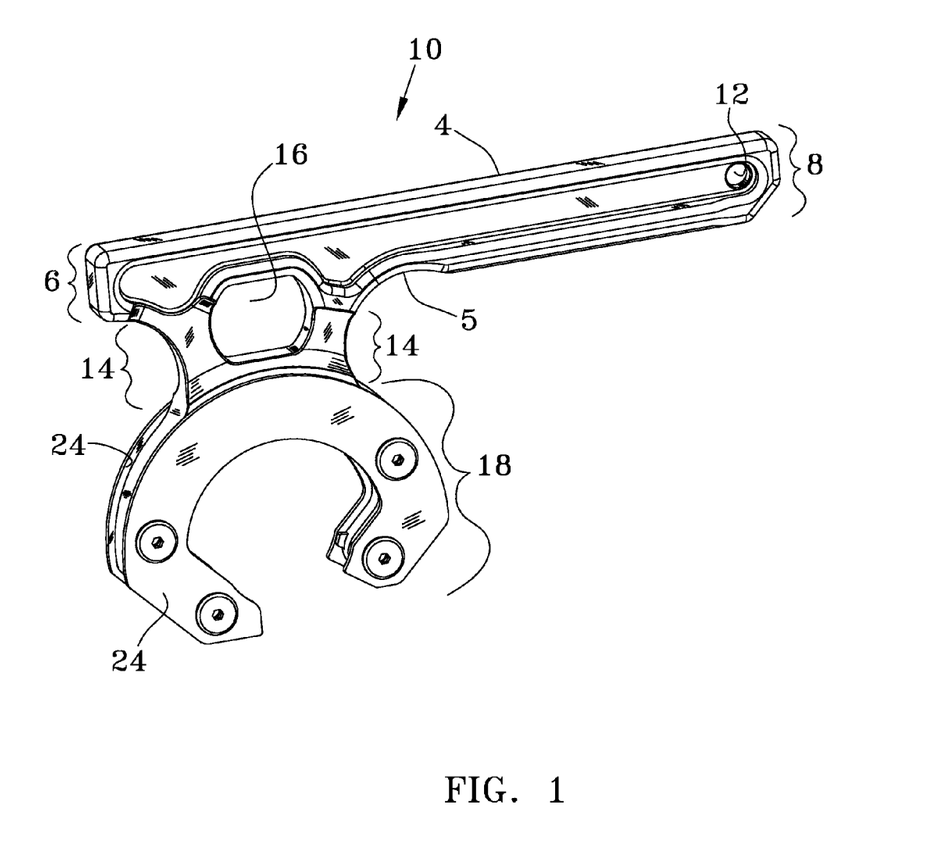
FIG. 1 is a perspective view of the hitch-coupling tool of the present invention.
Figure 11:
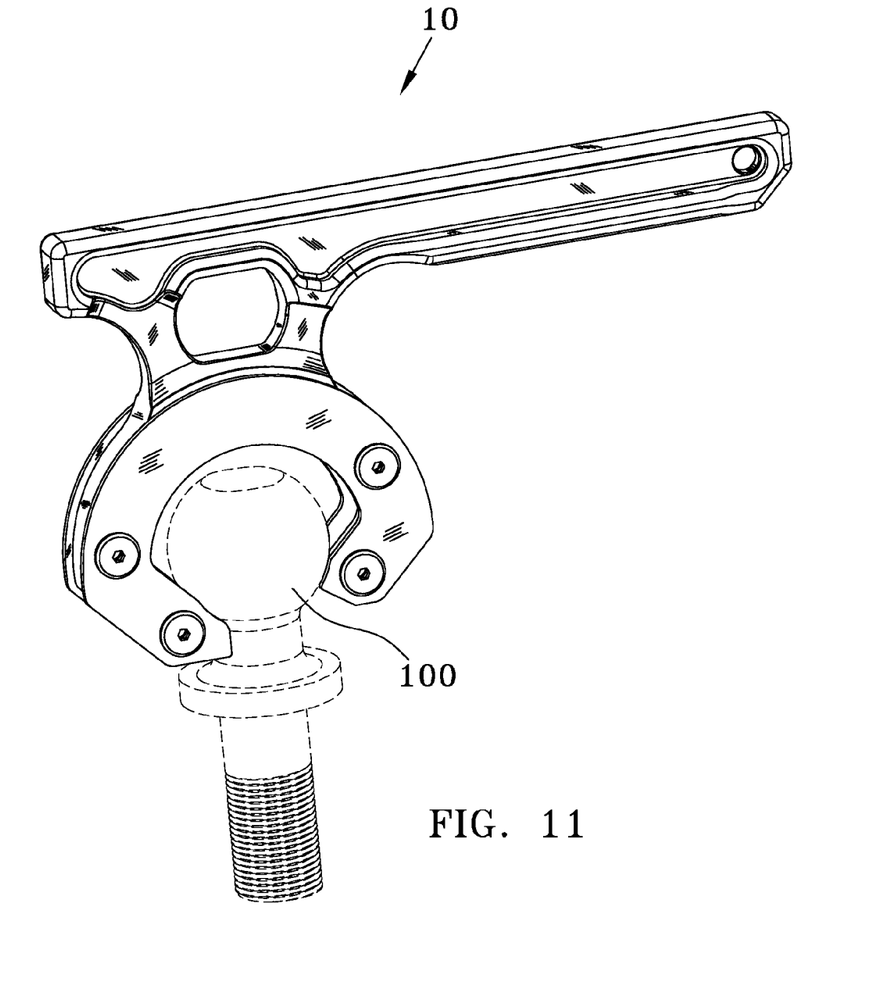
FIG. 11 is a perspective view of the hitch-coupling tool of the present invention engaged with a phantom hitch ball.

Looking at FIGS. 1 & 11 the hitch-coupling tool 10 of the present invention is illustrated. It is planar in configuration. Hitch-coupling tool 10 comprises a linear handle 4 with a blunt first end 6, an angled second end 8 and an ergonomic finger groove 5 formed as a concave hollowed out section along the longitudinal length of both sides of the handle 4. Blunt end 6 is designed to simply be as unobtrusive as possible to avoid interfering with the bumper of the towing vehicle. A mounting orifice 12 resides therethrough the handle 4 adjacent to second end 8. The handle 4 has a necked down region 14 adjacent the first end 6 that connects handle 4 to planar head (claw) 18. This necked down region extends normally (at 90 degrees) from the longitudinal axis of the handle 4. As illustrated head 18 has an asymmetrical crescent or generally "C" shaped design. It is to be noted that this is not a circular design. Gripping orifice 16 is formed therethough the necked down region of the handle. This serves to both reduce the tool's total weight and provides an additional grip for lifting directly above the mass of the hitch coupling. A user's fingers can be inserted through gripping orifice 16 should the user desire or need to use both hands when using tool 10 to move or manipulate a heavy hitch-head assembly.

As illustrated, handle 4 and head 18 form a unitary body for both durability and ease of manufacture. However, the handle 4, the handle's necked down region 14 and the head 18 could be constructed independently of one another and mechanically fastened together without departing from the scope of the invention. Handle 4, and head 18 can be comprised of any durable lightweight material, such as, but not limited to:

glass-filled nylon, aluminum, steel, stainless steel, or any durable polymer. The material of choice may be non marring to prevent potential damage to the surrounding vehicle's bumper.

Figure 2:
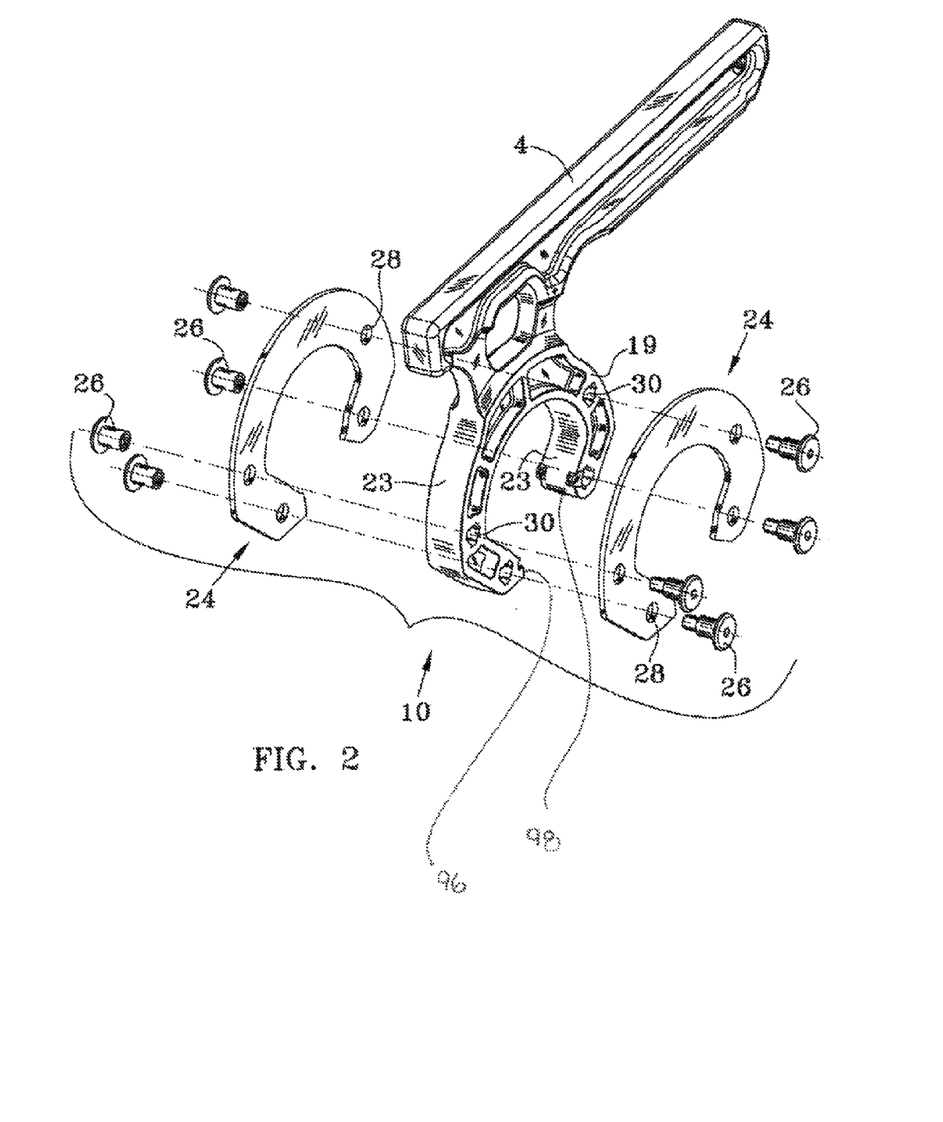
FIG. 2 is an exploded perspective view of the hitch-coupling tool of the present invention.
Figure 3:
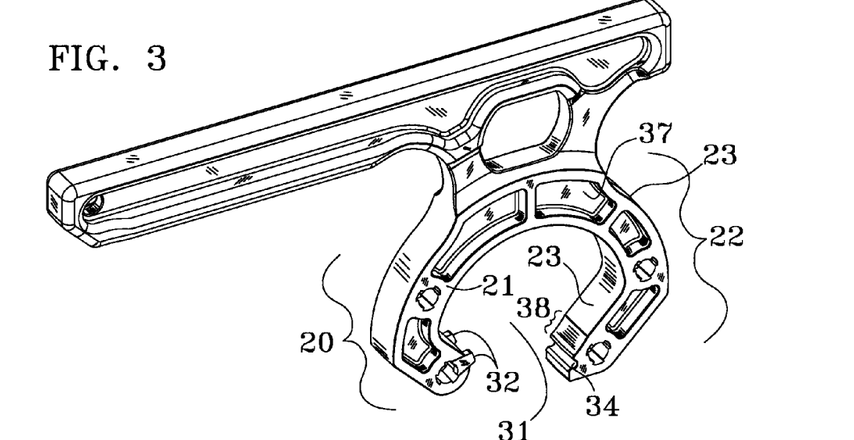
FIG. 3 is a perspective view of hitch-coupling tool of the present invention with the interchangeable coupling plates removed.
Figure 4:
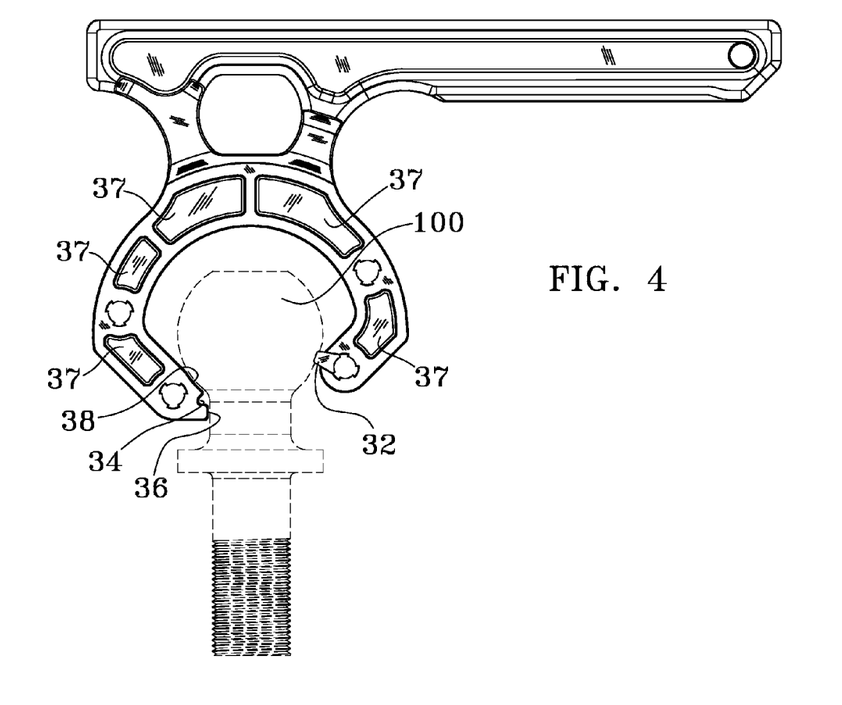
FIG. 4 is a left-side view of the hitch-coupling tool of the present invention engaged with a hitch ball, wherein the interchangeable coupling plates have been removed.
Figure 6:
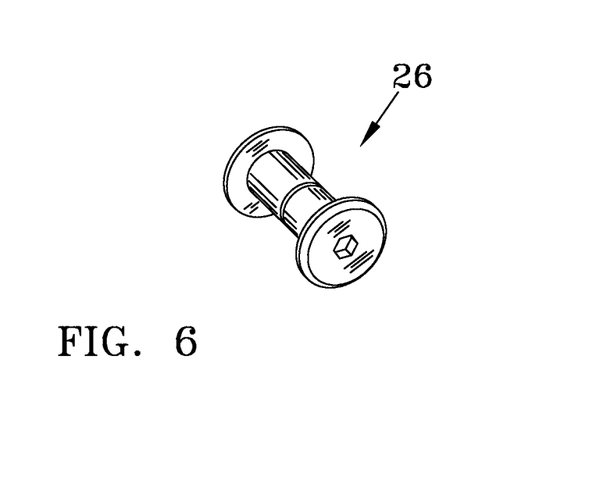
FIG. 6 is a perspective view of a nut/bolt assembly of the present invention.
Figure 7:
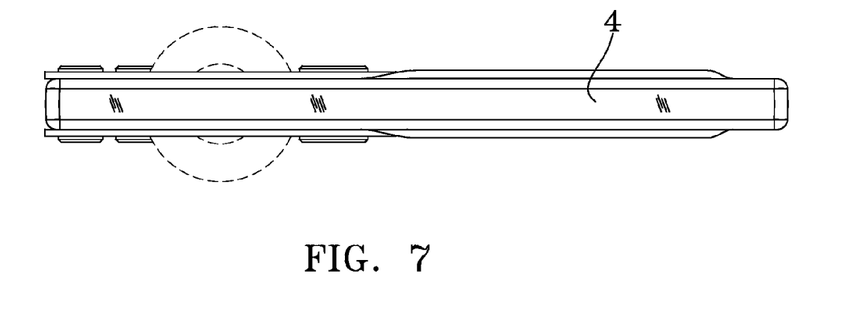
FIG. 7 is a top view of the hitch-coupling tool of the present invention engaged with a phantom hitch ball.
Figure 8:
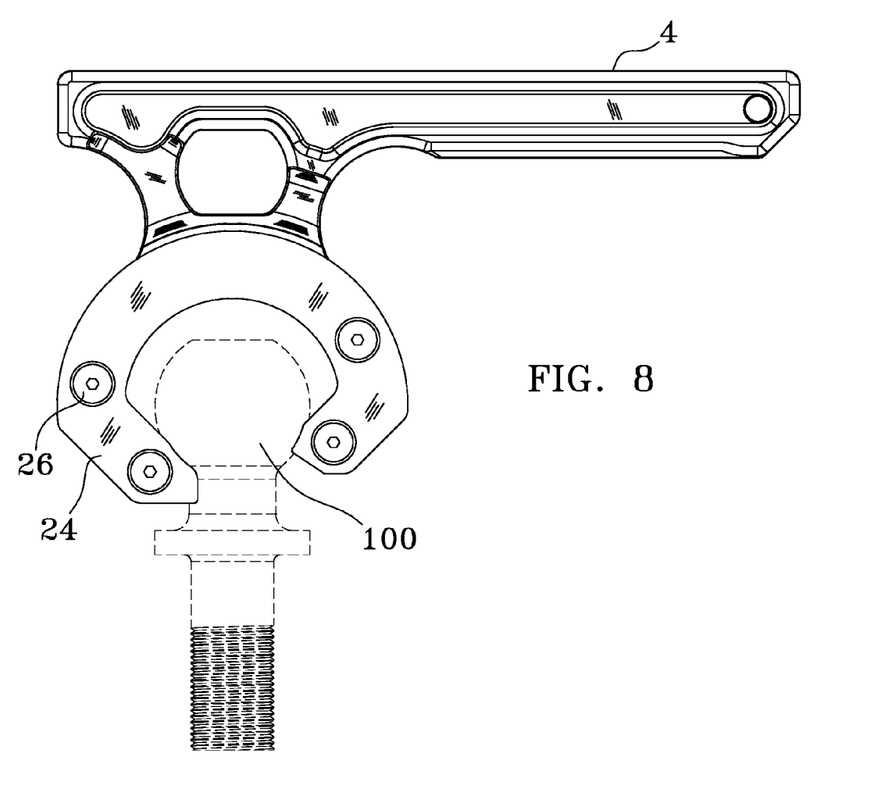
FIG. 8 is a left-side view of the hitch-coupling tool of the present invention engaged with a phantom hitch ball.
Figures 9, 10:
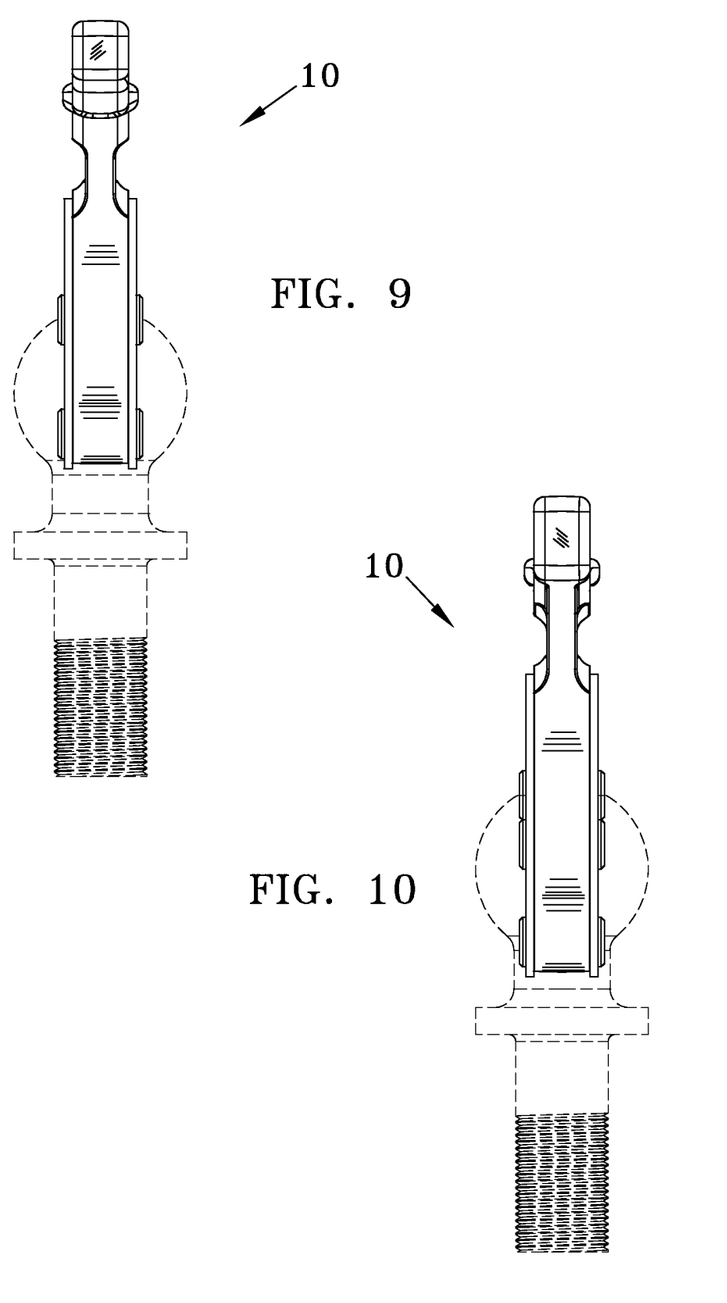
FIG. 9 is a front view of the hitch-coupling tool of the present invention engaged with a hitch ball.
FIG. 10 is a rear view of the hitch-coupling tool of the present invention engaged with a phantom hitch ball.

Looking at FIGS. 2-4 it can seen be that head 18 has a first planar face 19 and a second parallel planar face 21 (FIG. 3) Inner shoulder 23 lies between first face 19 and second face 21 (See FIG. 3) and defines the thickness of the tool. Shoulder 23 lies generally perpendicular to both the first and second faces and the linear axis of the tools handle 4. Numerous recessed channels 37 on first face 19 and second face 21 add both a unique design element while also reducing the weight of tool 10 (FIG. 4). In FIG. 2-3 it can be seen that the crescent shape of head 18 is not symmetrical, rather each of its ends are non arced and have different length linear sections terminating at the first crescent end 96 and second crescent end 98. Since there is nothing between the first crescent end 96 and the second crescent end 98 the concavity of the head is open and the planar cavity formed therein (as discussed above) is opem. The shorter of the linear sections forms the short-coupling arm 20 terminating at the second crescent end 98 and the longer of the linear sections forms long-coupling arm 22 terminating at the first crescent end 98. There are interchangeable coupling plates 24 that have the same contour as the head 18 and are affixed mechanically to both the first and second faces of the head 18. As illustrated in FIG. 2 these coupling plates 24 are removably connected to first face 19 and second face 21 via four nut/bolt assemblies 26, (FIG. 6) which pass through plate orifices 28 and connect within head orifices 30 as is well known in the art. There is a plethora of other styles of removable mechanical fastenings that could accomplish this feature as is well known in the art.

Figure 13:
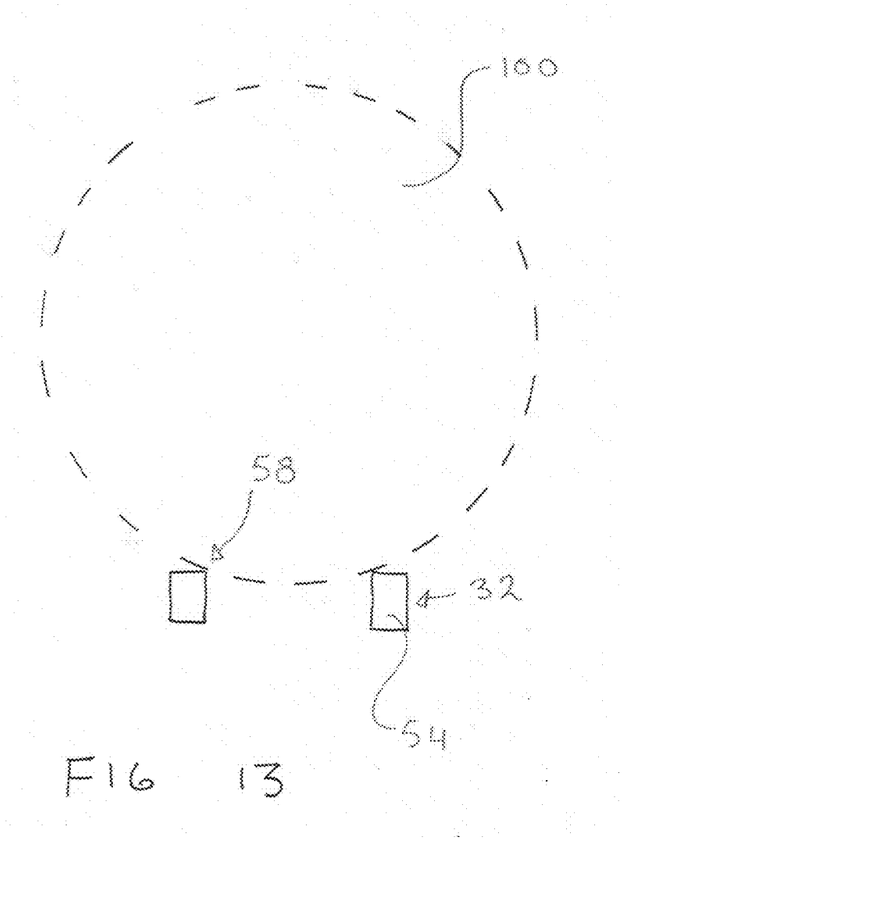
FIG. 13 is a side cross sectional view taken with a phantom hitch ball showing the contact points with the carbide inserts.

Still looking at FIGS. 2-4 short-coupling arm 20 and long-coupling arm 22 form an open-ended, hitch ball grabbing plane 31 within the concavity of the crescent geometry. The unique geometry of both short-coupling arm 20 and long-coupling arm 22 are designed to work in unison to provide the most stability when tool 10 is in the loaded position (i.e. connected to a hitch ball). This is because they will reside at two different vertical elevations approximately 180 degrees apart about the lower hemisphere of the hitch ball 100 when in use. Two replaceable gripping prongs 32 extend from short-coupling arm 20. and by virtue of their spacing (the spacing between individual prongs), it is the inside corner 58 of each gripping prong 32 that contacts hitch ball 100. Because of the weight of the hitch ball 100 and attached hitch-head assembly (not illustrated), the inside corner of the gripping prongs 32 slightly indent hitch ball 100 "biting" into hitch ball 100, to aid in securing hitch ball 100 within the hitch ball grabbing plane 31 (and the hitch-head to which hitch ball 100 is attached). This is best illustrated in FIG. 13. The "bite" by gripping prongs 32 keep tool 10 from rotating under load, and provide the only contact surface for hitch ball 100 on short-coupling arm 20. Gripping prongs 32, can be made of any durable material, including but not limited to tungsten carbide, steel, stainless steel, or a durable polymer, but it is to be noted that in the preferred embodiment the gripping prongs 32 are made of a material that is harder than the metal of the hitch ball 100, preferably in the Rockwell C hardness scale greater than 55.

Figure 12:
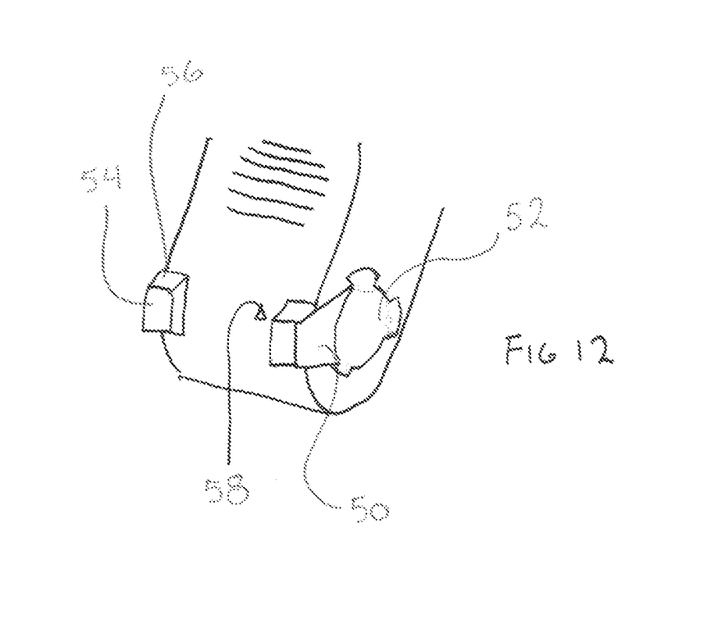
FIG. 12 is a perspective, partial view of the carbide inserts.

Looking at FIG. 12 it can be seen that the gripping prongs 32 are replaceable planar, wedge shaped bits or inserts that are retained by their enlarged insertion (rear) end's 52 geometry fit into a matingly configured recess formed in the short-coupling arm 20 (not illustrated). Their front face 54 has a rectangular, blunt planar configuration that meets their top and bottom planar faces 56 at a slightly obtuse angle (less than 100 degrees) and their tapered planar side faces 50 at a maximum of 90 degrees plus or minus 10 degrees. The resultant wedge configuration has a sharp top inside corner 58. This may be enhanced by the manipulation of the angle the gripping prongs 32 are anchored in the short coupling arm 20, as would be well known in the industry as "toeing in." The gripping prongs 32 are further constrained within the recess by coupling plates 24.

Figure 14:
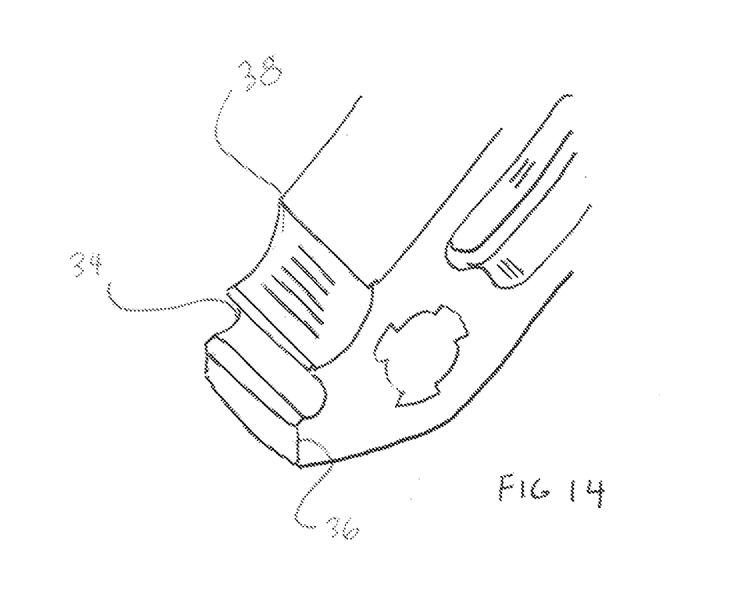
FIG. 14 is a perspective, partial view of the shallow ball channel.

Looking at FIG. 3 and FIG. 14, it can be seen that inner shoulder 23, in the region of the long-coupling arm 22 on the head 18, has a shallow ball-channel 38 in which a small section of hitch ball 100 can rest, as is illustrated in FIG. 4. This channel 38 is a concave groove that lies perpendicular to the first and second faces 19 and 21 of the head. At the long-coupling arm 22 end of the head 18 beyond the shallow ball-channel 38 there is a clearance groove 34 and a neck-abutment extension. The clearance groove 34 and neck-abutment extension allow for the gripping prongs to be able to contact the ball 100 before any other part of the head 18 except for the shallow ball-channel 38. Both the shallow ball channel 38 and the gripping prongs 32 contact the spherical lower hemisphere of said hitch ball 100. As can be seen, the preferred embodiment of planar tool 10 uses a three contact point, hitch ball suspension system arranged adjacent the opposing ends of the tool's planar, asymmetrical crescent shaped head 18. Two of the contact points lie adjacent first crescent end 96 and the remaining contact point lies adjacent the second crescent end 98. Because of the planar nature of the tool 10 and its crescent shaped head 18, the opposing first and second crescent ends 96 and 98 with their contact points, reside 180 degrees apart about the surface of a hitch ball when centered and lifted.

Looking at FIGS. 1 & 11 it can be seen that the planar faces of optional coupling plates 24, are dimensionally scaled to be larger than the planar first face 19 and planar second face 21 of the head 18, such that when coupling plates 24 are connected to these sides of the head 18, the coupling plates 24 extend equally beyond all the side peripheral edges of faces 19 and 21. Specific coupling plates 24 to accommodate different sized hitch balls have lengthened regions at their ends as is discussed herein. While the coupling plates 24 are optional and are not required for tool 10 to engage hitch ball 100 and allow a user to carry a load-leveling hitch-head, coupling plates 24 are designed to increase the rigidity of tool 10 and prevent the crescent shaped head to "open up" or twist under excessive load, should the tool be made of a lightweight material such as glass filled nylon. However, it is to be noted that this alternate embodiment with the coupling plates 24 installed on the head 18 do aid in retaining the hitch ball 100 within the confines of the head 18.

In models of the hitch-coupling tool 10 wherein the coupling plates reside flush with the edge of head 18 (first face 19, and second face 21), there would be a 3 point "grip" on the hitch ball. As used herein "point" could also include a "region" of contact and is not restricted to one physical point.

Figure 5:
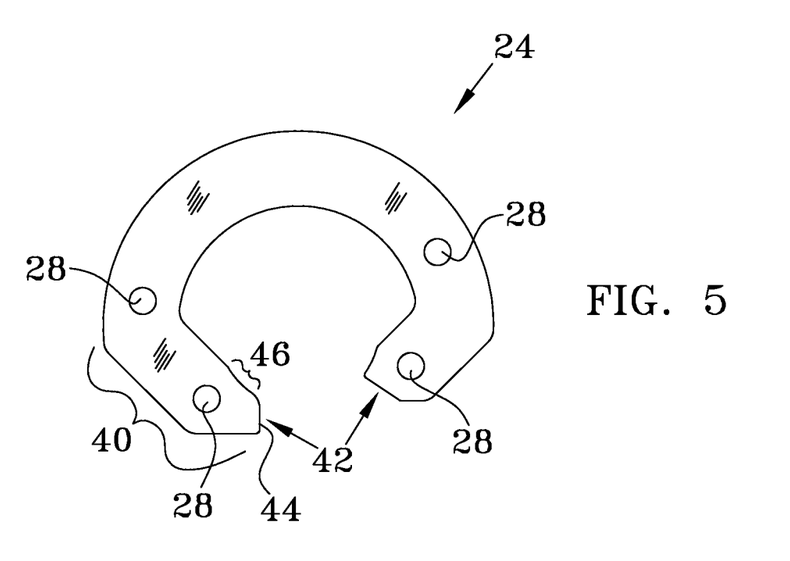
FIG. 5 is a front view of an interchangeable coupling plate of the present invention

A accommodate all standard sized hitch balls, a user can simply use larger or smaller coupling plates to accommodate different sized hitch balls. Using correspondingly sized coupling plate 24, tool 10 can accommodate three sizes of hitch balls 1⅞", 2", and 2 and 5/16". Turning to FIG. 5 it can be seen that section 40 of plate 24 corresponds geometrically to the lower section of long-coupling arm 22. Section 40 can simply be lengthened (resulting in a smaller opening 42) to accommodate a smaller hitch ball 100. For ease of manufacture, the placement of plate orifices 28 are not altered in making different sized plates 24 to accommodate different sized hitch balls. The portion of plate material between orifice 28 and blunt end 44 of section 40 is manufactured to be longer or shorter depending on the hitch ball sizing. When coupling plates 24 are connected to first face 19 and second face 21 of head 18, hitch ball 100 will contact gripping prongs 32 on short-coupling arm 20 and will rest in plate notches 46 in coupling plates 24. Due to the separation between the inner faces of plates 24 when installed on a head 18, and the spherical geometry of the hitch ball 100, plates 24 add four additional contact points on the hitch ball in conjunction with the two gripping prongs 32 and the shallow ball channel 38 to garner a 7-point "grip" on the hitch ball's lower hemisphere.

Coupling plates 24 can be made of any durable material including but not limited to steel or stainless steel.

In operation the hitch-coupling tool 10 is simply slid over the hitch ball 100 and positioned at an approximate 90 degree angle with the hitch ball 100 as is illustrated in FIG. 11. The user is now ready to lift the hitch-head assembly.

Having thus described the invention, what is claimed as new and desired to be secured by Letters Patent is as follows:

1. A hitch-coupling tool comprising:
    a handle; and
    a planar, asymmetrical crescent shaped head having a first crescent end and a second crescent end in a spaced configuration so as to define an open planar cavity within a concavity of said head, said head to accommodate a hitch ball suspended within said concavity by at least three contact points with said head, said handle and said head forming a unitary body;
    wherein said head has at least two gripping prongs extending from said second crescent end wherein said prongs are at least two of said contact points, and at least one ball channel groove formed adjacent to said first crescent end wherein said groove is one of said contact points, and a first planar face with a first coupling plate mechanically affixed thereto and a second, parallel planar face with a second coupling plate affixed thereto, with a thickness there between said faces, wherein said ball channel groove extends between said faces along said thickness of said head; and
    wherein said first and second crescent ends reside approximately 180 degrees apart on a spherical lower hemisphere of said hitch ball when suspended within said concavity.

2. The hitch-coupling tool of claim 1 wherein said coupling plates are larger in surface area than said first face and said second face such that when said coupling plates are connected to said head, said coupling plates extend beyond the edge of said first face and said second face.

3. The hitch-coupling tool of claim 2 wherein said coupling plates further contain plate notches for the resting engagement of said hitch ball.

4. The hitch-coupling tool of claim 1 wherein said hitch ball suspended within said concavity is suspended by seven contact points with said head.

\* \* \* \* \*